United States Patent [19]

Koda

[11] 4,087,095
[45] May 2, 1978

[54] PNEUMATIC RECORD PLAYER

[76] Inventor: Masuo Koda, 1096-19 Imaizumi, Kamakura, Kanakawa, Japan, 247

[21] Appl. No.: 747,003

[22] Filed: Dec. 2, 1976

[51] Int. Cl.$^2$ .................. G11B 3/60; G11B 3/10
[52] U.S. Cl. ........................ 274/9 R; 274/23 A; 274/39 A
[58] Field of Search ............ 274/9 R, 23, 39; 308/Dig. 1

[56] References Cited

U.S. PATENT DOCUMENTS

| 3,751,044 | 8/1973 | Sawada | 274/39 A |
| 3,479,038 | 11/1969 | Eisner | 274/23 A |
| 3,482,232 | 12/1969 | Farrand et al. | 274/23 A |

Primary Examiner—Richard E. Aegerter
Assistant Examiner—John W. Shepperd

[57] ABSTRACT

A record player system wherein a hollow turntable platter is supported with an internal inserted supporting body and incorporated with a driving means mounted on said supporting body. During operation, said turntable platter is slightly floated on said supporting body with compressed air induced into the interior of said hollow turntable platter through a conduit formed within said supporting body. A transversely elongated tonearm is fixed on a cylindrical slider which is slidably mounted on a straight horizontally elongated hollow tube which is slightly departed from a turntable surface at an adjacent location to said turntable platter. Compressed air is induced into said hollow tube via a conduit means and discharged from plural orifices arranged on a peripheral surface of said hollow tube to press an interior wall surface of said slider, and then preventing contact of said slider's interior wall with said peripheral surface of said hollow tube to eliminate resistances of tonearm's operation of a straight-line tracking.

13 Claims, 9 Drawing Figures

PNEUMATIC RECORD PLAYER

BACKGROUND OF THE INVENTION

This invention relates generally to a record player system and more particularly to a pneumatic record player system comprising an air-cushioned turntable platter with a straightly-travelling air-cushioned tonearm.

There have been provided several solutions in the art to make a stabilization of a rotation of a turntable platter to eliminate its vibration or rumber, wow and flutter. Multiplying the weight of a turntable platter or employing a high-quality motor, precise in operation, for driving a turntable platter are conventional ways and obvious in the art. However, it has been found that the mentioned conventional prior arts are not so preferable in use since the weighting of a turntable platter consequently brings about a need for a peculiarly-framed stiff and accurate bearing means for the turntable platter, and such a high-quality motor of an audio apparatus is very expensive. Employing a weighted turntable platter incorporated with a conventional bearing means is rather desirable and preferable.

In addition, in the prior art driving systems for the turntable platter, such as a rim-drive system which energizes a turntable platter with a motor via an idler means, a belt-drive system employing a pulley-belt engagement for a turntable platter rotation, and a direct-drive system wherein a turntable platter is substantially incorporated with a driving shaft of a motor, it has been found that the direct-drive system is comparably reliable and superior in operation. The direct-drive system never includes in the provability of slippages between each driving or transmitting means since it does not employ, substantially, any intermediate means for driving the turntable platter. It has been found that the direct-drive system is superior on some features as Signal to Noise Ratio or so forth.

As to a tonearm of a recond player, it has long been desired to attain a mechanism which operates as a cutting lathe of making an original record master. An original record master is cut or engraded by a stylus of a cutting lathe moving on a radius-line of a record circle from a peripheral position to the center, straightly, forming phonogram grooves, whereas a conventional tonearm is formed in elongated shape and rotatably pivoted on a proper portion of a player surface adjacent to a turntable platter with a vertical post means. Accordingly, a tracking of a stylus of a conventional tonearm which travels in an arc-line is inevitably not identical with the original tracking of a cutting lathe of its stylus. The difference between two travelling paths of two trackings is called "tracking error" which is preferable to be reduced as much as possible for an accurate playback of an audio apparatus. Quite recently, a straight-line tracking mechanism comprising a sliding transversly elongated tonearm mounted on a straight horizontally elongated beam means which is departed from a player surface and supported with a fixing means near the turntable platter has been provided. However, the provided prior straight-line tracking mechanism is not so practical since it employs a peculiar complicated mechanical-synchronous means for deriving the sliding tonearm, e.g. with a gear engagement or so forth.

SUMMARY OF THE INVENTION

Therefore, it is the main object of this invention to provide a novel or improved record player system comprising a direct-drive air-cushioned turntable platter and an air-cushioned tonearm of straight-line tracking type for eliminating the above-mentioned disadvantages of the prior art record player systems.

It is an another object of this invention to provide a pneumatic record player system wherein a turntable platter is provided with a hollow space within it or shaped as a bell-like-configuration, in which a supporting body of an upper portion is housed and said supporting body being formed with a vertical air-conduit means on its lower portion, through which compressed air is induced into said hollow turntable platter to slightly float said turntable platter on said supporting body, holding it stationary, during an operation. A driving motor of a conventional type is mounted vertically on said supporting body within said hollow turntable platter. A vertical driving shaft of said driving motor is directly engaged with said turntable platter on its center portion as a center spindle. According to this construction, there is no necessity for placing a peculiarly-constructed bearing means for sustaining a weighted turntable platter and the operation of the wieghted turntable platter is sufficiently enough and excellent only with a conventional driving motor.

It is further an another object of this invention to provide a pneumatic record player system wherein a elongated tonearm is transversely attached on cylindrical slider which is slidably mounted on a horizontal elongated straight hollow tube. Said hollow tube is formed with plural orifices on its peripheral surface in row and fixed adjacent to a turntable platter slightly departing from a player upper surface. Compressed air is induced into said hollow tube via a conduit means passing from a compressor and discharged from said orifices to float or support said tonearm in a proper condition. According to the construction, a smooth straight-line tracking of a tonearm stylus can be easily attainable without any peculiarly-constructed devices.

It is more an another object of this invention to provide a pnematic record player system wherein a straight-line tracking tonearm is carried with a piston-slider slidably supported within a hollow tube which is formed with plural orifices on its interior surface and an air passing channel within the wall. Said air passing channel is fluid-communicated with a compressor and the interior space of said hollow tube via said plural orifices. Compressed air passing from said compressor supports said piston-slider in a proper resistless condition within said hollow tube.

It is further an another object of this invention to provide a pneumatic record player system wherein a crossing tonearm is carried with a cylindrical slider which is slidably mounted on a non-porous straight hollow tube, and said tonearm is formed a longitudinal air conduit within it, which is fluid-communicated with the interior surface of said cylindrical slider facing to said non-porous hollow tube or a straight supporting means. A suitable flexible hose means is connected with said air conduit of said tonearm, so that compressed air supplied from a compressor passes said flexible hose means, said air conduit of the tonearm, and an annular interval between said cylindrical slider and said non-porous hollow tube forming an air-cushion in said annular interval, and floats said tonearm for a straight-line tracking.

These and other objects, features and advantages of this invention will become more apparent upon a reading of the following detailed description being proceeded with the accompanying drawings for one and additional embodyments according to this invention.

DESCRIPTION OF PREFERRED EMBODYMENTS

Figure 1:
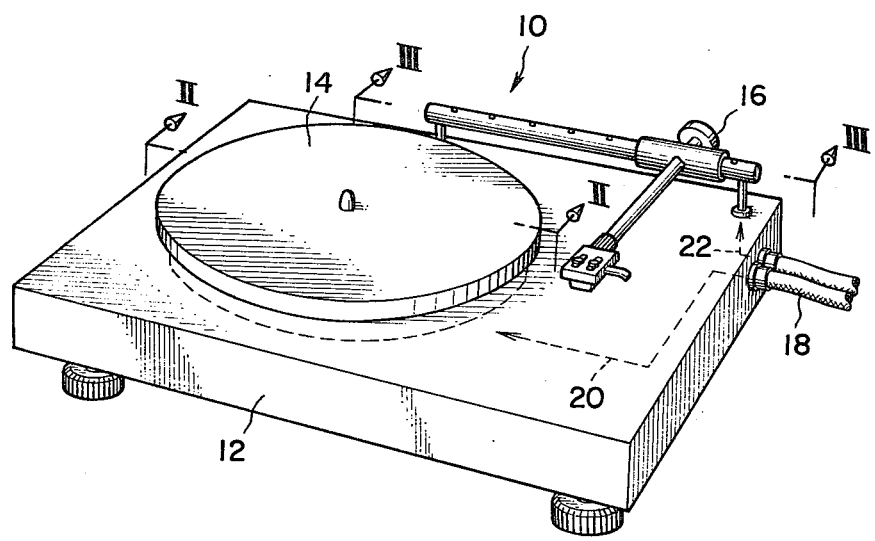
FIG. 1 is a perspective view of a pneumatic record player system according to this invention.

Refering to the drawings, one preferred embodiment according to this invention is illustrated perspective in FIG. 1 designated generally by numeral 10 which contains a pneumatic turntable platter 14 and a pneumatic tonearm 16 disposed on an upper surface of a player cabinet 12 with a conventional engaging means (not shown). Compressed air for stationary supporting said platter 14 and said tonearm 16 are passed respectively to each part through air-flowing paths 20 and 21 from a suitable air source or compressor (not shown) connected to said cabinet 12 with a extending hose means 18.

Figure 2:
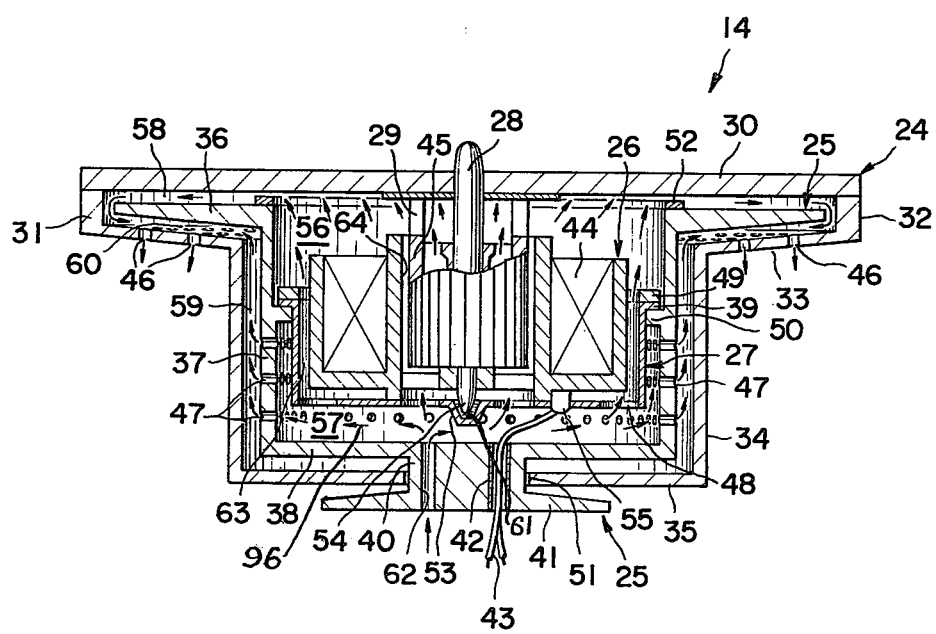
FIG. 2 is a sectional view taken on line II — II of FIG. 1 showing the interior constructions of a pneumatic turntable platter.

Said turntable platter 14 illustrated in FIG. 2 contains a rotor disc or platter member 24, a supporting body member 25, a mounting frame member 27 and a driving motor 26. The configuration of said supporting body member 25 is shaped as a goblet i.e. comprises a foot portion 41 on its lower end, a column portion 40 extending upwardly from said foot portion 41, a circular base plate portion 38 attached on the upper end of said column 40, a barrel portion 37 extending upwardly from the peripheral annular end of said base plate 38, and an annular flange portion 36 extending outwardly from the peripheral upper end of said barrel 37. Said supporting body member 25 is supported on a floor or base plate of said cabinet 12 only with said foot portion 41. This foot 41 is stopped with a conventional means (not shown). A pneumatic conduit means 62 connected with said air-flowing path 20 is pierced vertically in said base 38, said column 40 and said foot 41, which compose a lower portion of said supporting body member 25. An annular wall 50 is projected horizontally on a interior surface of said barrell portion 37 at the middle position of the barrel 37. A bearing means 52 for sustaining said platter means 24 is provided on said flange portion 36. Said bearing means 52 is an annular elastic material attached on the interior peripheral end of said flange portion 36 and bears said platter member 24 during a static condition of the system's. Said barrel portion 37 is further provided with plural horizontal orifices 47 under said wall 50 circumferentially, which communicate a lower chamber 57 and a channel 59.

Said motor 26 is mounted on said supporting body member 25 with the mounting frame member 27. Said frame member 27 is shaped as an ashtray-configuration comprising a circumferential flange 39 which is placed on said annular wall 50 of the supporting body 25. A peripheral lug or flange 49 of said motor 26 is attached on said circumferential flange 39 of said frame 27. Said frame member 27 is provided with vertical apertures 48 on its base, which allow an air-passing from a lower chamber 57 to an upper chamber 56 via intervals or channels 63, 64 disposed around or within the motor 26. Said motor 26 is arranged to form some intervals or channel 63, 64 on its peripheral or interior. Numeral 44 designates a winding of said motor 26. A rotor 45 of said motor 26 is secured on a rotor shaft or a center spindle 28 which is engaged with a disc 30 of said platter member 24 via conventional engaging means. Plural elongations 29 of the rotor 45 further intermediate or connect the rotor with the disc 30.

Said disc 30 is for receiving or placing a phonogram record on it and composes one part of said platter member 24. A sleeve 31 shaped as such a configuration corresponding to said supporting body member 25 is also one part of said platter member 24. Said sleeve 31 comprises circumferential cylindrical portion 32 secured on under circumferential peripheral end of said disc 30, a slanting annular portion 33, a second cylindrical portion 34 and a base plate portion 35. Said slanting annular portion 33 intermediates said circumferential cylindrical portion 32 with an another narrow cocentric cylindrical portion 34, and covers the under surface of said flange 36 of the supporting body member 25. The diameter of said second cylindrical portion 34 is arranged smaller than the first cylindrical portion 32 and opposes to the side surface of said barrel portion 37 of the supporting body member 25. The cylindrical portion 34 and the barrel 37 define an annular air-channel 59 communicated with said lower chamber 57. Said base plate portion 35 is a circular plate connected under the second cylindrical portion 32 on its circumferential end, and is provided with a center aperture 51 at the center portion. Said center aperture 51 receives or bears the column 40 of said supporting body 25. The interval between said aperture 51 and column 40 is preferable to be slidably sealed with a suitable means.

Said mounting frame 27 is provided with a center recess 53 in which a suitable conductive liquid is applied, and the lower end 54 of said center spindle 48 is inserted to be immersed, so that static electricity generated on circumference of the turning platter member 24 is grounded with a circuitry comprising of said spindle 28, the liquid in the recess 53, the frame 27 and so forth. An insulating pipe 42 vertically pierced or inserted in said supporting body member 25 of the lower portion guides conductors 43 which is electrically connected to electrodes 51 of the motor 26 for power supply.

The under surface of said disc 30 and the upper surface of said flange 36 of the supporting body 25 define an air-channel 58, whereas the under surface of said flange 36 and said slanting annular portion 33 of the platter member 24 define an another air-channel 60. The slanting annular portion 33 is provided with plural vertical orifices 46 on its circumference, which communicates said channel 60 to an ambient space.

In operation, compressed air is passed from said compressor (not shown) to said conduit means 62 of the supporting body 25 through said hose 18 and said air-flowing path 20. The compressed air induced into said lower chamber 57 of the barrel portion 37 of the supporting body via said conduit means 62, is further passed into said upper chamber 56 and said channel 59, respectively through said intervals 63, 64 of the motor 26 and said orifices 47 of the barrel portion 37 of the supporting body. The compressed air flowing into the upper chamber 56, in turn, passes said bearing means 52 on the flange 36, said channel 58, the circumferential end of said flange 36, and said channel 60, where the compressed air meets with the other opposing air flowing coming from the orifices 47 through said channel 59, and the joining compressed air is discharged from said orifices 46 into an ambient space.

By the passing of the compressed air into the platter, air-cushions are formed within the platter, especially in the circular space of said air-channel 59 which supports said platter member 24 co-centrically around said supporting body 25. An another air-cushion formed within said air-channel 58 of a laminated ring configuration between said disc 30 and said flange 36 of the supporting body supports the platter member 24 vertically in even and stationary condition. These two air-cushions in the platter are very effective in eliminating wow or flutter of the turning platter, especially, with using a considerably weighted platter means. According to this invention, there is no need for the peculiary-constructed bearing means for sustaining the turntable platter member. The compressed air supplied from the compressor is enough to support the platter member 24 even if it is constructed from a considerably heavy material.

It has been found that the discharge orifices 46 are preferable to be pierced on the horizontal slanting portion 33. Said orifices 47 of the barrel 37 are preferable to be formed at a lower part of said barrel under the mounting frame 27.

Figure 3:
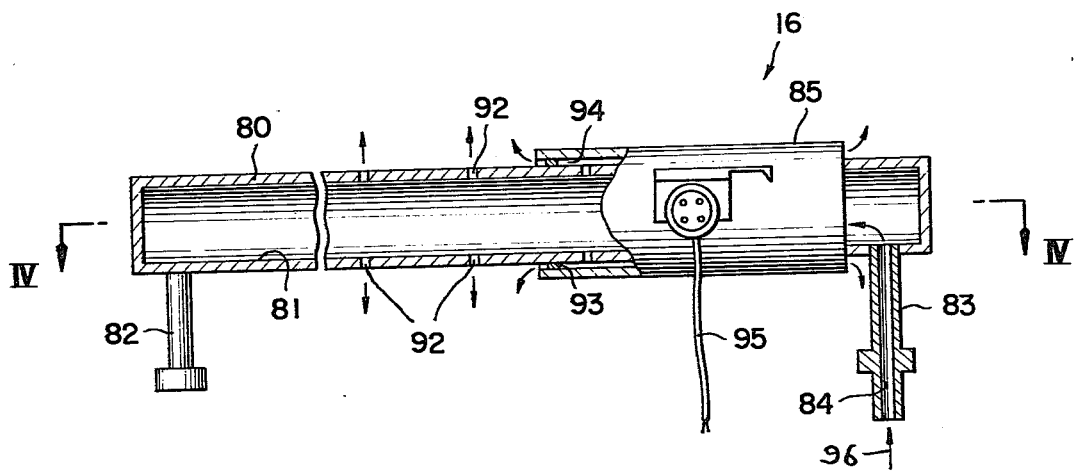
FIG. 3 is an enlarged sectional view of a pneumatic tonearm taken on line III — III of FIG. 1 with a cylindrical slider partially broken away.
Figure 4:
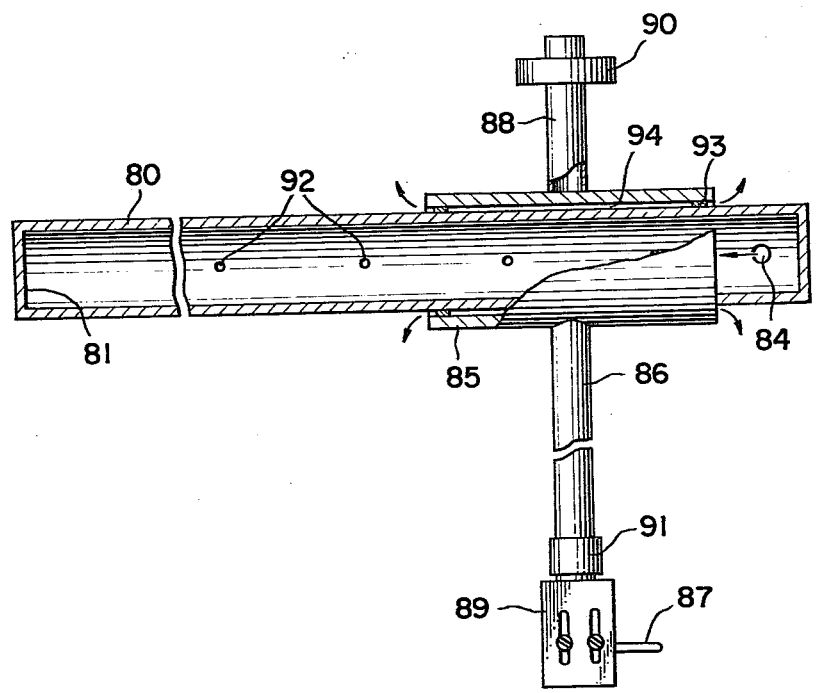
FIG. 4 is a sectional view of said tonearm taken on line V — V of FIG. 3 showing an air flowing path in said tonearm.

Refering now to the FIGS. 3 and 4 the neumatic tonearm 16 contains a front arm portion 86, a rear arm portion 88, a cylindrical slider 85 and a hollow tube 80. Both arm portions 86 and 88 are carried by said cylindrical slider 85 which is slidably mounted on said elongated straight hollow tube 80. Said hollow tube 80 is supported with two post means 82 and 83 on a upper surface of said player cabinet adjacent to the turntable platter. The two post means 82 and 83 are preferable to be positioned at the both ends of said hollow tube 80. One post means designated 83 is provided with a vertical piercing conduit 84 connected with said air-flowing path 22 for supplying the compressed air from said or modified compressor. Said hollow tube 80 is provided with plural identical orifices 92 in row with same distances, on its peripheral side wall. These plural orifices 92 is fluid-communicated with the interior elongated room 81 of said hollow tube 80, so that, the supplied compressed air from the compressor is, in turn, induced into said conduit 84, said room 81 and said orifices 92 and then discharged from the orifices. Each orifices 92 is positioned on the hollow tube 80 with same distances to the adjacent orifices 92. The interior surface of the cylindrical slider 85 is provided with two annular packings 93 adjacent to the both ends of the slider, defining an annular interval 94 between the hollow tube 80 of the side surface and the slider 85. The compressed air discharged from said orifices 92 further passes said annular packings 93 and forms an air-cushion in the annular interval 94, and then floats or supports said slider 85 resistlessly on the hollow tube 80. The annular packings 93 bear the cylindrical slider 85 and the tonearm on the hollow tube when the compressed air is not supplied. Said front arm portion 86 and said rear arm portion 88 are attached on each opposing side of said cylindrical slider 85 and extending straightly normal to the hollow tube 80. The rear arm portion 88 carries an adjustable balance weight 90 which is for the adjustment of the tracking force on a stylus. A cartridge or pickup 89 is mounted on the front arm portion 86 with a connector nut 91. Numeral 87 indicates a finger rest or hook. The stylus fixed on said pickup 89 is not shown. A playback signal is transmitted to a suitable audio circuit means (not shown) through leads 95.

Accordingly, after supplying of the compressed air into the tonearm, if the stylus of the pickup 89 is manually put on a phonogram record placed on the turning platter, the operating record grooves guides or directs the tonearm smoothly from one peripheral point to the center, straightly, which is identical with the original travelling operation of a cutting lathe for a original record master. The air-cushion formed within the interval 94 is sufficiently effective to support the tonearm co-centrically and resistlessly.

Figure 5:
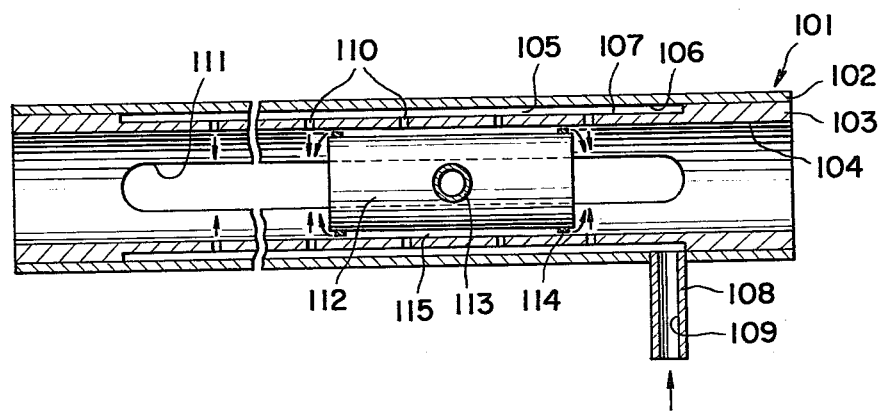
FIG. 5 is an enlarged partial sectional view of an another modified embodiment of a pneumatic tonearm according to this invention.

FIG. 5 illustrates an another embodiment of the pneumatic tonearm, wherein a piston type slider 112 is housed in a hollow tube 101. The hollow tube 101 contains an outer cylinder 102 and an inner cylinder 103. The two cylinders are welded or sealed each other to form a room 106. Each cylinder 102, 103 comprises same corresponding longitudinally elongated holes 111 on their front and rear sides, through which a tonearm 113 is extending outwardly. The inner cylinder 103 is provided with an annular recess 107 on its peripheral surface, which defines an air-channel 106 with the opposing interior surface of the outer cylinder 102. The channel 106 is fluid-communicated with the interior 104 of the hollow tube via plural orifices 110 arranged on the cylinder 103 in the range of said annular recess 107. A conduit 108 connects the channel 106 to a compressor through an air-flowing path. Said piston slider 112 is provided with two annular packings 114 on its peripheral surface at both ends, with which the tonearm is supported in the hollow tube when the compressed air is not supplied. Compressed air is passed to, in turn, said conduit 108, said channel 106, said orifices 110, said intervals 115 and said annular packings 114, and then discharged. An air-cushion formed within the annular interval 115 smoothly supports the slider 112 and the tonearm. Record grooves of a phonogram on a turning platter guides the floated pneumatic tonearm smoothly or resistlessly in operation.

Figure 6:
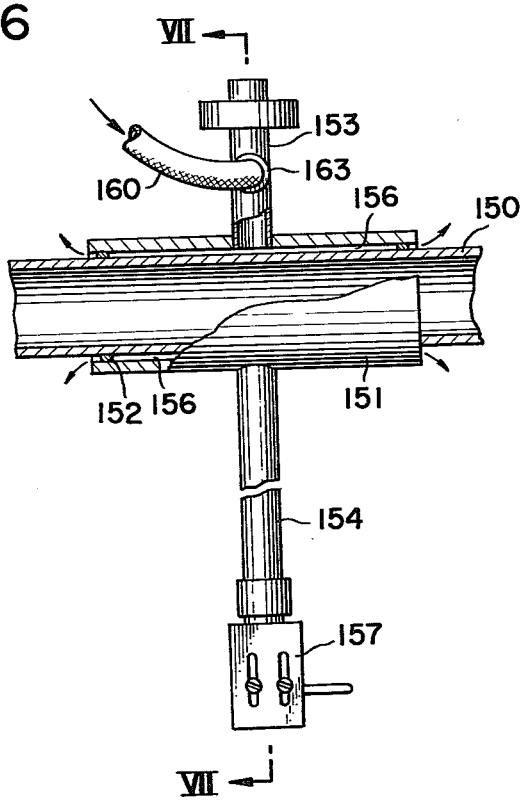
FIG. 6 is an enlarged partial sectional top view of a further modified embodiment of a pneumatic tonearm according to this invention, wherein compressed air is induced through a tonearm portion.
Figure 7:
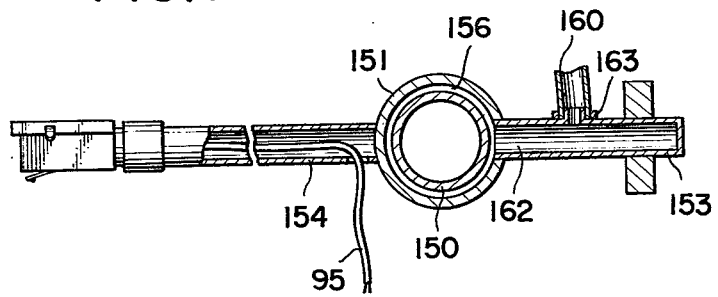
FIG. 7 is a sectional elevation view taken on line VII — VII of FIG. 6.

In a further modified embodiment illustrated in FIG. 6 and FIG. 7, a suitable flexible air-supplying hose means 160 connected to a compressor is provided on a rear arm portion 153 of its upper surface. Said rear arm portion 153 comprises an air conduit 162 which is fluid-communicated with said flexible hose means 160 with a suitable sealing means 163. Said conduit 162 is further communicated with an annular interval 156 which is defined in a cylindrical slider 151 mounted on a straight hollow tube 150. Annular packings 152 are provided on the interior surface of said slider 151 at both ends and bears the slider on the hollow tube when the compressed air is not supplied. Said slider 151, said hollow tube 150 and said annular packings 152 define said annular interval 156. Said hollow tube 150 is non-porous on peripheral side surface and supported over a player cabinet with a suitable means as same with preceding embodyments of the tonearm. Said cylindrical slider 151 carries said rear arm portion 153 and an opposing front arm portion 154 on its sides, which compose a normally-extending tonearm. A suitable pickup 157 is carried by the end of said front arm portion 154. Compressed air being supplied from a suitable compressor via said flexible hose means 160, passes, in turn, said conduit 162, said annular interval 156 and annular packings 152 and produces an air-cushion in said annular interval 156 effective to float the tonearm in a resistless co-centrical condition. Numeral 95 designates leads of said pickup 157, connected with an appropriate audio circuit means (not shown).

Figure 8:
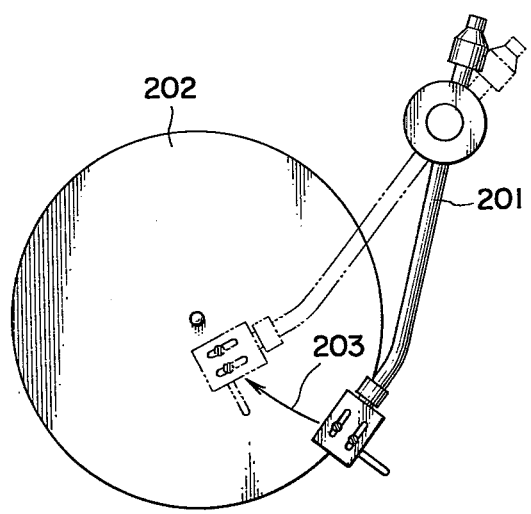
FIG. 8 is a diagrammatic top illustration of a conventional record player with a pivoted tonearm, showing an operation of an arc-line tracking of the pivoted tonearm on a phonogram record.
Figure 9:
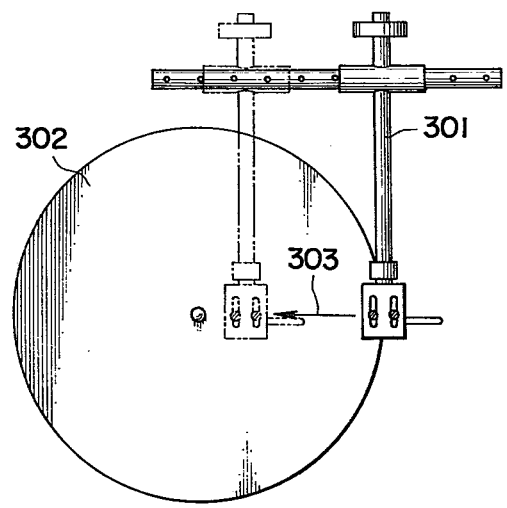
FIG. 9 is an another diagrammatic top illustration of a record player system provided with a straight-line tracking tonearm, showing the stylus travelling path of a straight-line tracking.

Refering to another additional drawings, a conventional tonearm 201 is as illustrated in FIG. 8, rotatably mounted on a turntable surface and the stylus of the tonearm travels in an arc-line 203 on a phonogram record 202. In FIG. 9, a tonearm 301 of a straight-line tracking type relating to this invention allows the operation of a straight-line tracking 303 (radius) of the stylus on a record 303.

As being apparent in the above description concerning to the preferred embodiment, a record player system according to this invention is very accurate and reliable in operation, and then, very simple in construction, since it does not employ any particular mechanical means for sustaining or bearing the platter or tonearm. If desired, a conventional automatic control means for the tonearm operation or the platter may be housed or employed in the record player system in combination.

There will now be obvious to those skilled in the art many modifications and variations of the above described structures without departing from the scope or spirit of the present invention. To such modifications and variations, the present invention extends, and is only restricted with the following claims.

What is claimed is:

1. A record player device comprising: a platter member comprising a disc for supporting a record, a hollow platter member, and a base plate portion, said disc having a center spindle; a support means for providing support; a driving motor; and conduit means adapted for providing compressed air from a compressor; slanting said base plate portion having a center aperture formed therein; said hollow platter member being composed of two concentric cylindrical portions as an upper first cylindrical portion with a greater diameter than the other, and lower second cylindrical portion with a smaller diameter, the first cylindrical portion mounting the disc on an upper face thereof centrally of said disc; said second cylindrical portion being extended upwardly from the base plate portion; a horizontal annular portion having said two concentric cylindrical portion intermediated therewith; said support means comprising a supporting body member housed in said platter member, said support means including an annular flange portion positioned within said first cylindrical portion opposing said disc and said slanting annular portion, and defining an upper horizontal laminated annular air-channel and a lower horizontal laminated annular air-channel, a circular base plate portion positioned slightly over said circular base plate portion of the platter member, and the circular base plate potion having a supporting column portion which is vertically extended and projected outwardly through said center aperture of base plate terminating with a foot portion, and a barrel portion which intermediates said slanting annular flange portion of an inner peripheral end and a circumferential end of said circular base plate portion and faces toward an interior surface of said second cylindrical portion and defines a vertical annular air-channel; said driving motor being housed in said barrel portion of said supporting body member, oriented vertically as defining the interior room of said barrel portion into an upper chamber and a lower chamber, with the driving shaft of said motor being directly engaged with a center spindle of said disc of the platter member; and a vertical conduit means adapted for supplying compressed air and for receiving compressed air from a compressor and directing the same into said lower chamber, the vertical conduit means being inserted with said column and foot portion of the supporting body member; horizontal orifices formed on said barrel portion of a circumferential side in the range of said lower chamber for leading one part of said compressed air in said lower chamber into said vertical annular air-channel; vertical air-channel means for communicating said lower chamber with said upper chamber for passing another part of said compressed air in said lower chamber into said upper chamber, said upper horizontal laminated annular air-channel; and vertical discharge orifices formed on said slanting annular portion of said platter member in circumference discharging compressed air from said lower horizontal laminated annular air-channel into an ambient space.

2. A record player device of claim 1, icluding a mounting frame member inserted between said motor and said barrel portion, and vertical aperatures formed on said mounting frame member at its base for air-passing between said lower and upper chamber.

3. A record player device of claim 2, comprising a center recess formed on the base of said mounting frame member of its center adapted to receive a conductive liquid and said center spindle of its lower end, to allow a passing static electricity from said platter member to ground.

4. A record player device of claim 1, comprising an annular laminated bearing means provided on the upper surface of said horizontal annular flange portion of said supporting body member to sustain the platter member during the platter is not operated.

5. A record player device of claim 1, including a pneumatic tonearm which includes a slider means for laterally sliding movement of elements thereof; straight supporting means for mounting the pneumatic conearm, the straight supporting means being mounted on said support means and having the slider means mounted thereon adapted for lateral movement of the pneumatic tonearm; said conduit mean providing compressed air channeling between said straight supporting means and said slider means with the slider means positioned relative to said straight supporting means such that the slider means floats pneumatically on said straight supporting means.

6. A record player device of claim 5, comprising a pair of annular packings provided on the bearing surface of said slider means adjacent to its both ends to define an annular interval and to sustain the tonearm when compressed air is not supplied.

7. A record player device of claim 5, comprising two post means attached at both ends of said straight supporting means.

8. A record player device of claim 1, including a pneumatic tonearm which includes a straight hollow tube which is provided with plural identical discharge orifices on its peripheral surface in row equally spaced from one another and mounted on said support means at a level substantially above said platter; and a cylindrical slider slidably mounted on said hollow tube defining an annular interval between said straight hollow tube and said cylindrical slider; a separated crossing tonearm member carried with a pair of opposing side surfaces of said cylindrical slider; and an air conduit means connected with said straight hollow tube adapted to receive compressed air from a compressor into said hollow tube, said discharge orifices and said annular interval to float said tonearm member.

9. A record player device of claim 8, comprising a pair of annular packings provided on the interior surface of said cylindrical slider adjacent to both ends restricting said annular interval between said hollow tube and said slider.

10. A record player device of claim 1, including a pneumatic tonearm which includes a straight hollow tube having two substantially identical longitudinally-extending holes formed on its opposing side surfaces, an air-channel formed within the wall of said hollow tube, and identical plural orifices in rows spaced equally apart from one another on the interior surface of the hollow tube adapted to be connected with the air-channel; and the hollow tube being placed on said support means at a level substantially spaced above and adjacent to said platter; a piston slider slidably housed in said hollow tube and engaged with a crossing tonearm member extending outwardly through said longitudinal holes; and an air conduit means fluid-communicated with said interior air-channel adapted for supplying compressed air from a compressor into said internal air-channel, said orifices, and an annular interval between said hollow tube and said piston slider to float said tonearm member.

11. A record player device of claim 10, comprising a pair of annular packings provided on the peripheral surface of said piston slider adjacent to both ends restricting said annular interval between said hollow tube and said piston slider.

12. A record player device of claim 1, including a pneumatic tonearm including a straight supporting means mounted on said support means for movably mounting thereon a slider; a cylindrical slider slidably mounted on said straight supporting means defining an annular interval between said straight supporting means and said cylindrical slider; a crossing tonearm member carried with said cylindrical slider; an air conduit means formed within said tonearm member and fluid-communicated with said annular intervals of said slider; and a flexible hose means connected to said air conduit means and adapted for passing compressed air from a compressor into said annular interval to float said tonearm member.

13. A record player device of claim 12, comprising a pair of annular packings provided on the interior surface of said cylindrical slider adjacent to both ends restricting said annular interval between said straight supporting means and said cylindrical slider.

* * * * *